US011877654B1

(12) United States Patent
Cain et al.

(10) Patent No.: US 11,877,654 B1
(45) Date of Patent: Jan. 23, 2024

(54) MOTORIZED WALL-MOUNTED STORAGE SYSTEM

(71) Applicants: C. M. Cain, Roanoke, AL (US); Pete Demaggio, Jr., Folkston, GA (US)

(72) Inventors: C. M. Cain, Roanoke, AL (US); Pete Demaggio, Jr., Folkston, GA (US)

( * ) Notice: Subject to any disclaimer, the term of this patent is extended or adjusted under 35 U.S.C. 154(b) by 73 days.

(21) Appl. No.: 17/992,758

(22) Filed: Nov. 22, 2022

(51) Int. Cl.
*A47B 57/06* (2006.01)
*B66B 9/00* (2006.01)
*B66B 11/06* (2006.01)

(52) U.S. Cl.
CPC ................ *A47B 57/06* (2013.01); *B66B 9/00* (2013.01); *B66B 11/06* (2013.01)

(58) Field of Classification Search
CPC ......... A47B 57/06; A47B 46/005; B66B 9/00; B66B 11/02; B66B 11/04; B66B 11/06; A47F 3/11; A47F 3/08; B23Q 3/15526
See application file for complete search history.

(56) References Cited

U.S. PATENT DOCUMENTS 803,274 A * 10/1905 Deaver ................. A47F 5/0892 248/331
1,442,579 A * 1/1923 McArthur .............. A47B 71/00 312/258
2,499,791 A * 3/1950 Spencer ................. A47B 51/00 312/247
3,887,038 A * 6/1975 Buschbom ................ B66B 1/34 187/293
3,982,801 A * 9/1976 Heidorn ................. A47B 57/06 62/132
4,184,570 A * 1/1980 Edwards ................... B66F 9/02 187/401
5,143,182 A * 9/1992 Basta ........................ B63C 3/06 187/408
5,797,666 A * 8/1998 Park ................... A47B 21/0073 312/223.3
5,871,070 A * 2/1999 Contreras ................ B66D 1/04 187/263
6,241,048 B1 * 6/2001 Heilmann ................. B66F 7/02 254/311
6,676,233 B1 * 1/2004 Evans ....................... B66B 9/02 187/401
8,622,488 B1 * 1/2014 Kilby ..................... A47B 96/06 211/202

(Continued)

FOREIGN PATENT DOCUMENTS

WO WO 2006017645 8/2009

*Primary Examiner* — Devin K Barnett
(74) *Attorney, Agent, or Firm* — George L Williamson

(57) ABSTRACT

Method and apparatus for a wall mounted motorized storage system wherein a storage tray for holding items in storage is mourned on a framework having upper and lower, and either left or right side frame members which are mounted directly onto the wall of a building structure wherein left and right vertical rails provide a roller system for moving the storage tray up and down in response to movement of left and right chains which are driven by an electrically powered winch system. The lifting system also includes an upper rotating bar having left and right chain contacting sprockets thereon which the electrical winch engages and which moves the tray upwardly and downwardly. The electrically powered winch is controlled by a remote control.

16 Claims, 3 Drawing Sheets

(56) References Cited

U.S. PATENT DOCUMENTS

| | | | | |
|---|---|---|---|---|
| 8,875,844 | B2 * | 11/2014 | Janz | B66D 1/60 187/244 |
| 10,334,948 | B2 * | 7/2019 | Xiang | A47B 96/14 |
| 10,376,058 | B2 | 8/2019 | Bryan et al. | |
| 10,376,088 | B2 * | 8/2019 | James | A47J 31/52 |
| 10,617,232 | B2 * | 4/2020 | Taylor | A47B 57/06 |
| 10,729,238 | B2 | 8/2020 | Xiang et al. | |
| 11,407,623 | B2 * | 8/2022 | Boggess | B66F 7/28 |
| 2006/0086565 | A1 * | 4/2006 | Hernandez | B25H 1/16 182/1 |
| 2012/0248046 | A1 * | 10/2012 | Warner | A47B 51/00 211/1.57 |
| 2014/0252930 | A1 * | 9/2014 | Reid | A47B 46/005 312/247 |

* cited by examiner

MOTORIZED WALL-MOUNTED STORAGE SYSTEM

BACKGROUND OF THE INVENTION

Field of the Invention

The present invention relates generally to storage units, and more particularly, is concerned with a wall mounted storage system which is motorized so it can be automatically moved up and down on the wall of a garage or the like.

Description of the Related Art

Devices relevant to the present invention have been described in the related art; however, none of the related art devices disclose the unique features of the present invention.

In U.S. Pat. No. 10,376,058 dated Aug. 13, 2019, Bryan, et al., disclosed an automated motorized modular shelf system. In U.S. Patent Application Publication No. 2006/0086565, dated Apr. 27, 2006, Hernandez, et al., disclosed a raisable work bench. In U.S. Patent Application Publication No. 2014/0252930, dated Sep. 11, 2014, Reid, et al., disclosed a vertically retractable shelving for home or office. In U.S. Pat. No. 10,334,948 dated Jul. 2, 2019, Xiang, et al., disclosed an electric shelf. In U.S. Pat. No. 10,729,238 dated Aug. 4, 2020, Xiang, et al., disclosed an electric shelf. In U.S. Pat. No. 8,622,488 dated Jan. 7, 2014, Kilby, et al., disclosed a vertically retractable shelf system. In World International Patent Office Patent Publication No. WO 2006017645, dated Aug. 5, 2005, Bober disclosed a motorized lift device.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a wall mounted motorized storage system wherein a storage tray for holding items in storage is mounted on a framework having upper and lower, and either left or right side frame members which are mounted directly onto the wall of a building structure wherein left and right vertical rails provide a roller system for moving the storage tray up and down in response to movement of left and right chains which are driven by an electrically powered winch system. The lifting system also includes an upper rotating bar having left and right chain contacting sprockets thereon which the electrical winch engages and which moves the tray upwardly and downwardly. The electrically powered winch is controlled by a wired remote control.

An object of the present invention is to provide a storage system which can be easily mourned onto the wall of a building such as the garage of a home. A further object of the present invention is to provide a storage system which can utilize otherwise wasted storage space in a building. A further object of the present invention is to provide a storage system which can be easily operated by a user. A further object of the present invention is to provide a storage system which can be relatively easily and inexpensively manufactured.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS:

In order that the invention may be more fully understood, it will now be described, by way of example, with reference to the accompanying drawings in which.

LIST OF REFERENCE NUMERALS

Figure 1:
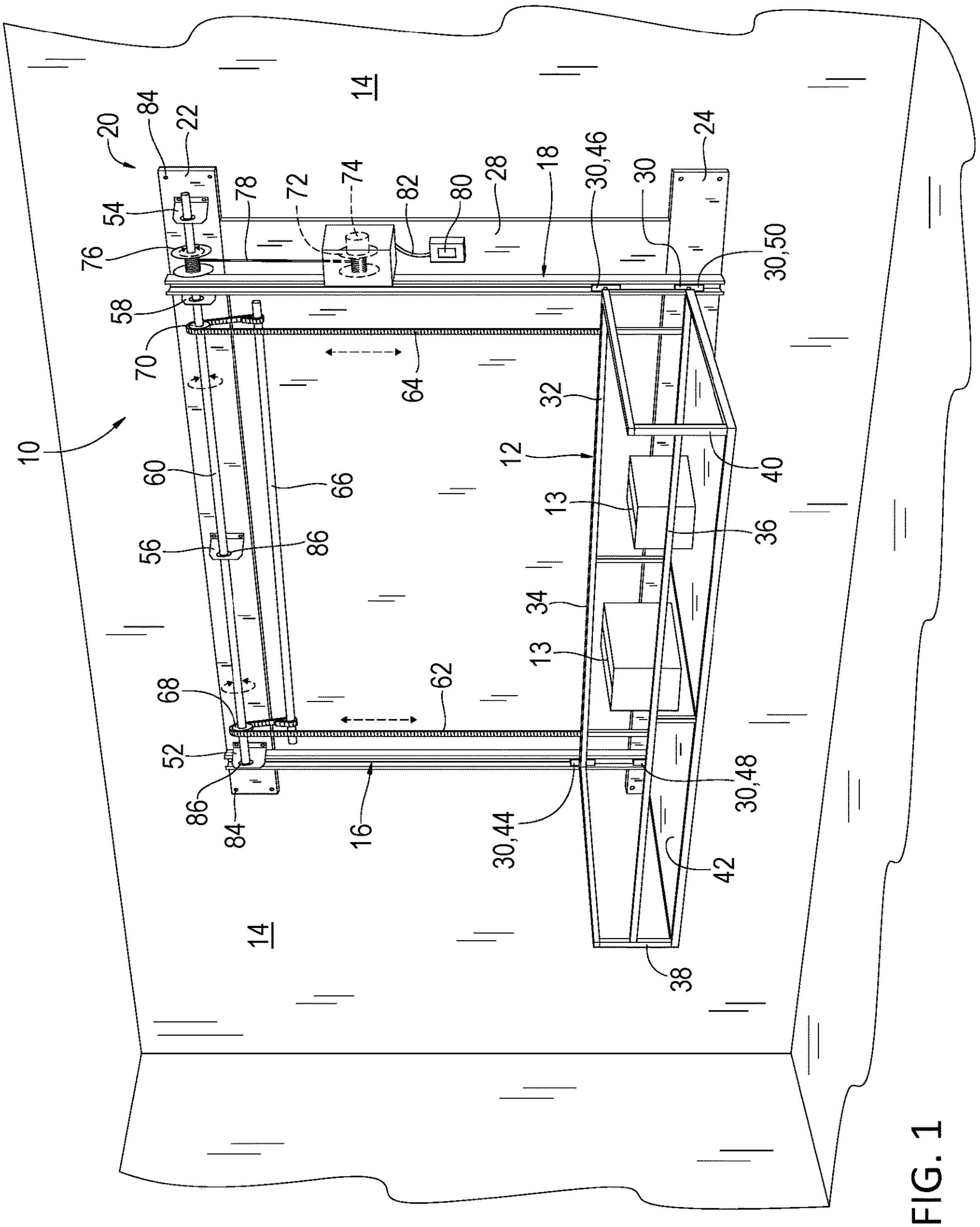
FIG. 1 is a front perspective view of the present invention shown in operative connection on a wall.

With regard to reference numerals used, the following numbering is used throughout the drawings.

10 present invention
12 storage tray
13 articles
14 wall
16 left rail
18 right rail
20 framework
22 upper horizontal frame member
24 lower horizontal frame member
26 coupler
28 right vertical frame member
30 rollers
32 framework
34 rear frame member
36 front frame member
38 left frame member
40 right frame member
42 floor
44 left upper roller
46 right upper roller
48 left lower roller
50 right lower roller
52 left support bracket
54 right support bracket
56 middle support bracket
58 right inner support bracket
60 rotating bar
62 left chain
64 right chain
66 counterweight rod
68 left sprocket
70 right sprocket
72 winch
74 electric motor

76 take-up reel
78 cable
80 remote control
82 electrical wire
84 fasteners
86 bearing

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 4 illustrate the present invention wherein a wall-mounted, motorized storage system is disclosed and which is generally indicated by reference number 10.

Figure 2:
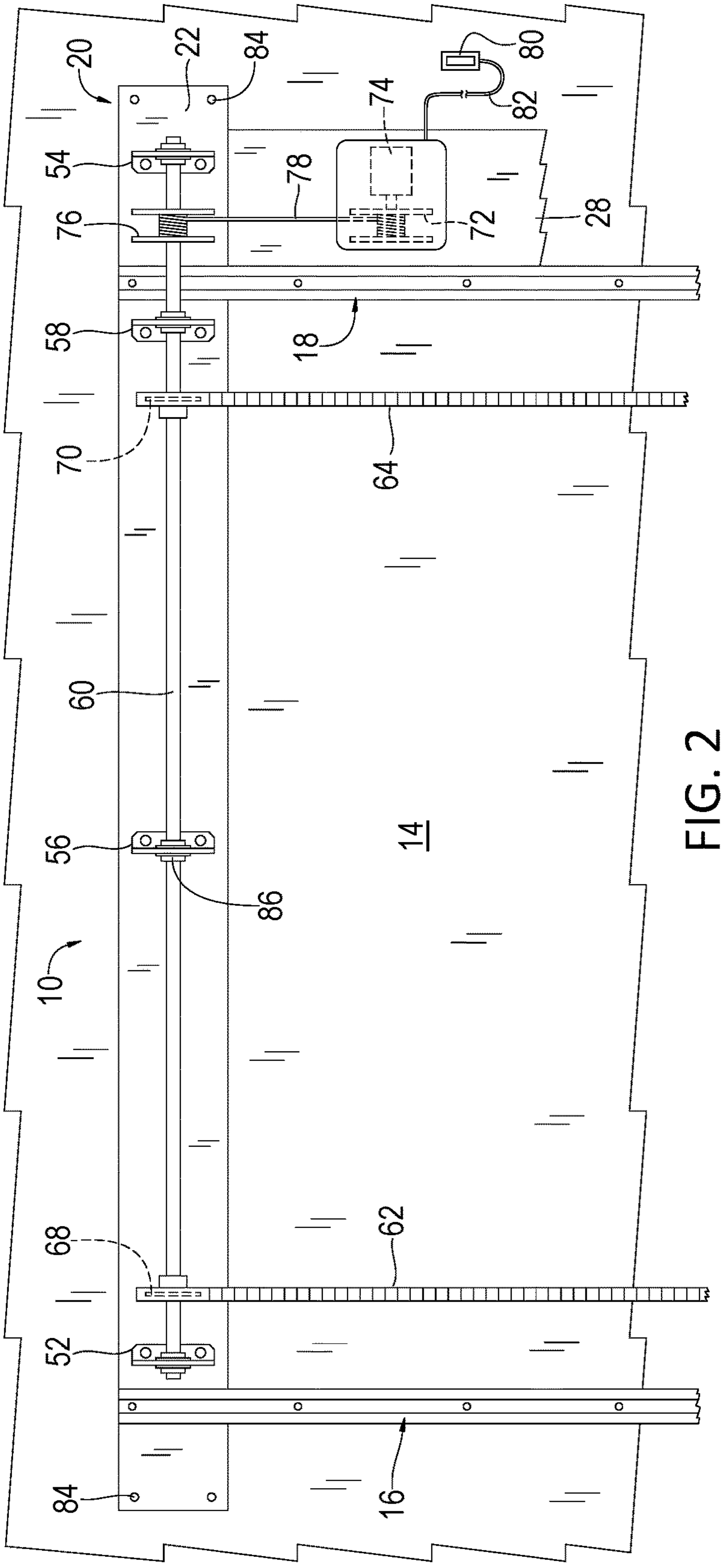
FIG. 2 is a front elevation view of portions of the present present invention.
Figure 3:
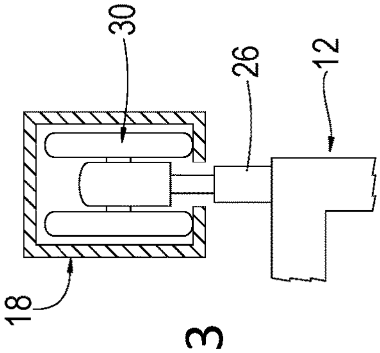
FIG. 3 is a front elevation view of portions of the present invention.
Figure 4:
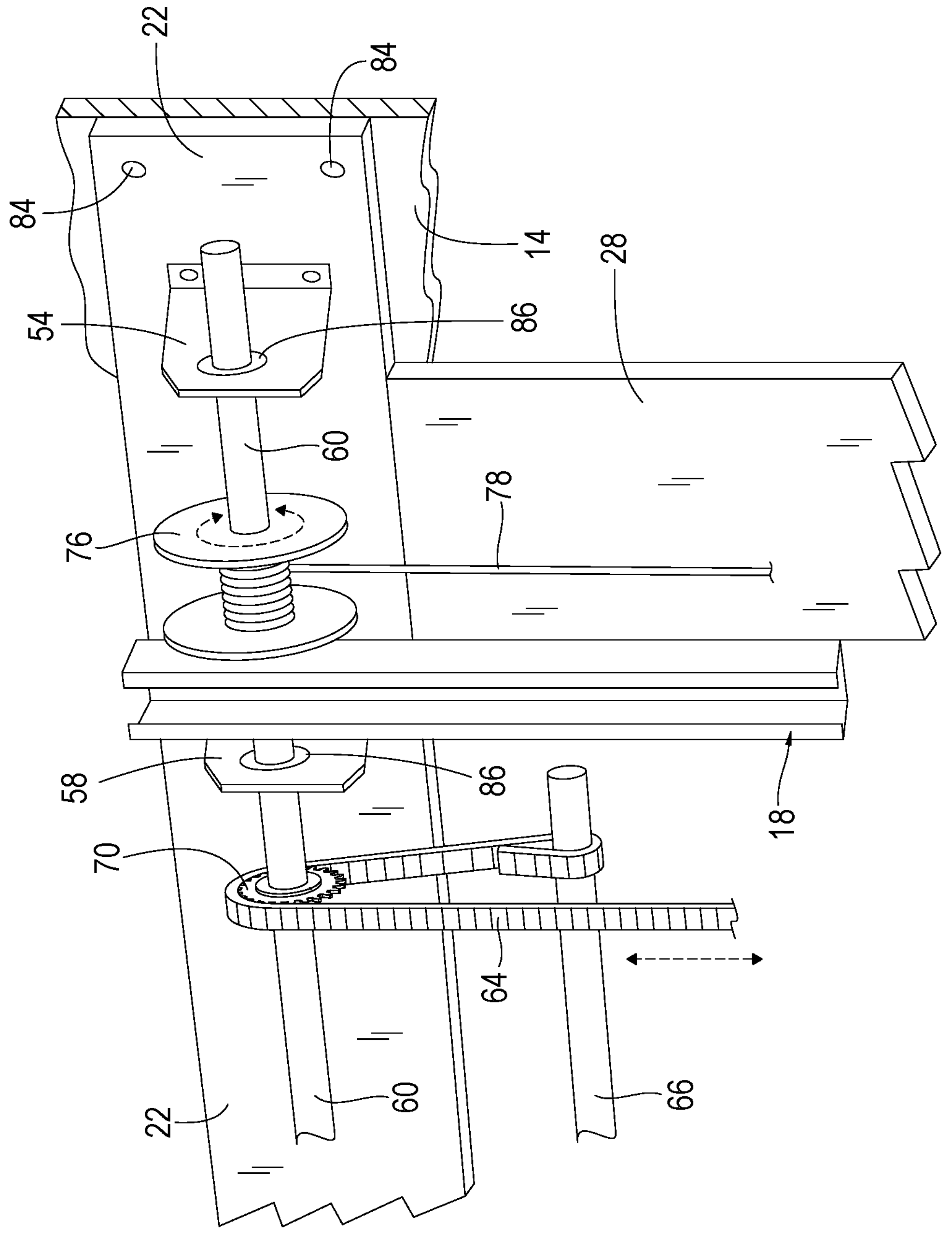
FIG. 4 is a front perspective view of portions of the present invention.

Turning to FIGS. 1-4, therein are shown various views of the present invention 10 wherein a storage tray 12 for holding articles 13 is mounted onto a wall 14 of a building above the floor of the room, e.g., a garage, so that the tray 12 moves up and down left and right rails 16, 18 and which is mounted onto the framework 20 which framework is mounted onto the wall 14 using fasteners 84. Note that fastener 84 could be a screw or nail or the like. The framework 20 includes an upper and lower horizontal frame member 22, 24 along with either a left or right vertical frame member 28 as the right vertical frame member 28 can also be disposed on the left side as the operator may select. FIGS. 1-2 show the vertical frame member 28 on the right side. The tray 12 moves upwardly and downwardly on a plurality of rollers 30 which are mounted into the left and right rails 16, 18 with the rollers 30 being attached to the rear of the tray 12 by couplers 26. The tray 12 includes a framework 32 for containing articles 13 within the tray 12 which framework 32 is disposed around the tray's outer periphery edges wherein the framework 32 includes a rear frame 34, a front frame 36, left and right frame members 38, 40 along with a floor 42 upon which the articles 13 in storage rest. The rollers 30 include left and right upper and lower roller units 44, 46, 48, 50 wherein each roller unit includes two individual wheel-shaped rollers mounted on each axle as shown in FIG. 3. Each of the left and right rails 16, 18 have an upper and lower end wherein the upper ends of the rails are attached to the upper horizontal frame members 22 and the lower ends of the rails are mounted onto the lower horizontal frame members 24. Also mounted onto the upper horizontal frame member 22 are a plurality of forwardly-extending support brackets 52-58 which are somewhat like flange brackets each having a built-in bearing 86 mounted in the center of the support brackets wherein there is a left support bracket 52 and right support bracket 54 along with a middle support bracket 56 and a right inner support bracket 58. A rotating bar 60 which extends from substantially the left end to the right end of the upper horizontal frame member 22 rotates on the central bearing 86 of the support brackets 52, 54, 56, 58. The tray 12 is moved up and down the left and right rails 16, 18 by use of left and right chains 62, 64 wherein a lower end of the left and right chains is connected to the tray 12 and the upper ends are each connected to opposite ends of a counterweight rod 66. The left and right chains travel over corresponding left and right sprockets 68, 70 fixed to rotating bar 60. The rotating bar 60 is motorized by the use of a winch 72 driven by an electric motor 74 wherein the pickup reel 76 is fixedly mounted onto the rotating rod 60 so that when the winch 72 is turned by the motor, then the take-up reel 76 and rotating bar 60 are turned by means of a cable 78 which is joined to the winch so that when the electric motor 74 turns the winch 72, the cable 78 being connected to the take-up reel 76 turns the rotating bar 60 which in turn rotates the sprockets 68, 70 thus raising and lowering the tray 12 via the left and right chains 62, 64. The winch 72 and motor 74 are controlled by a remote control 80 which may be hard wired via electrical connections 82 or which may be wirelessly connected to the motor 74 and winch 72 and may also be a handheld remote control 80. Note that remote control 80 could be a keyboard, keypad, one or more buttons, one or more switches or toggles and that a wireless device could be a wireless communication device such as a Wi-Fi, telephone app or the like.

The present invention 10 is a wall-mounted storage unit that moves up and down a rail system being lifted and lowered by an electric winch 72. More detailed description and exemplary dimensions follow; The present invention 10 is mounted on a 2"×8"×8' pine board 22 mounted horizontally at the top of the lifting system. The assembly includes 4-3-⅜" flange mounts 52-58 with a centrally disposed bearing 86 built-in with a 1" diameter hole. The upper assembly also includes one, 1"×94" cold-rolled steel bar 60 with 2-9 tooth sprockets 68-70 welded in place on it, The upper assembly also included two 6' disc welded in place as a take-up reel 76 for the winch cable 78 to spool on, Note that cable 78 could also be a chain or a strap.

The storage tray 12 is made of 16 gauge 1" square tubing and ¾"×⅛" angle. The tray 12 is 90" long×36" wide×12" tall. There is also 4-½" all thread couplers 26 welded in the tray 12 to connect the rollers 30. There are four box rail rollers 30 being (2") that screw into the ½" all thread couplers 26. The present invention 10 has #40 chains 62, 64 welded to the rear of the storage tray 12 on the proper 1" tubing. The chains 62, 64 are approximately 65" long and could also be a strap.

There are two box rails 16, 18 are about 72"×2-⅜"×1-⅞" mounted vertically and attached to the upper assembly and lower mount (2"×4"×8'). The rollers 30 on the tray 12 are inserted into box rails 16, 18 and raised and lowered by the winch 72.

The counterweight rod 66 is a 1-⅜"×79" cold rolled steel rod and is attached to the #40 chains 62, 64 and used to tension the chains so as to prevent them from slipping on 9 tooth sprockets 68, 70.

The electric winch 72 is rated at 1,200 lbs. of lift capacity with built-in auto braking. The winch 72 is designed to hold the load automatically and also has a wired remote 80 or the like.

The right vertical frame member 28 can be switched to the left side as the operator may select along with the winch 72 and the rotating bar 60 and related appurtenance can be flipped over so that the present invention 10 is operated in a left hand orientation in a mirror-image configuration compared to that illustrated in FIGS. 1-4. This is a user-selected feature of the present invention 10.

Left and right side designations regarding the present invention 10 are interpreted from the view of one in front of storage tray 12 and facing toward the wall 14. Note that tray 12 is considered to be in front of wall 14. Also, lines with arrowheads are sometimes placed on drawings to indicate potential motion or direction of movement of an item illustrated in the drawing.

By way of summary and by making reference to FIGS. 1-4, the present invention 10 includes a motorized storage system for mounting on a wall 14 having a framework having upper and lower horizontal frame members 22, 24 and a right vertical side frame member 28, the framework being attached to the wall, and left and right rails 16, 18 each having, upper and lower ends, wherein the upper ends of the left and right rails are attached to the upper horizontal frame member and the lower ends of the left and right rails are attached to the lower horizontal frame member, and a storage tray 12 for storing articles 13 thereon, wherein the storage tray is movably disposed on the left and right rails, and a plurality of rollers 30 attached to the storage tray, wherein the plurality of rollers are disposed in the left and right rails so that the storage tray rolls along the left and right rails to permit the storage tray to move upwardly and downwardly on the wall, and a rotating rod 60 disposed on the upper horizontal frame member, wherein the rotating rod is rotatable mounted on a plurality of support brackets 52-58, the support brackets being mounted on a front of the upper horizontal frame member, and left and right sprockets 68, 70 and a take-up reel 76 being disposed on the rotating rod, and a winch 72 containing a cable 78 on a spool, wherein the winch is disposed on the framework, the cable having first and second ends wherein the first end of the cable is connected to the spool on the winch and the second end of the cable is connected to the take-up reel, and left and right chains 62, 64 each having lower and upper ends, wherein the lower ends are connected to the storage tray and the upper ends are connected to a counterweight rod 66 for tensioning the chains, wherein an intermediate portion of the left chain passes over the left sprocket and an intermediate portion of the right chain passes over the right sprocket; and wherein when the winch turns in a first direction the storage tray is raised and when the winch turns in an opposite direction the storage tray is lowered. Furthermore, also included is an electric motor 74 disposed on the winch for turning the winch, and a remote control 80 for controlling the operation of the electric motor, and wherein the remote control is connected by hardwire 82 to the electric motor, and a containment framework 32 disposed around an outer peripheral edge of the storage tray for containing articles within the storage tray, and a coupler 26 for connecting each roller to the storage tray, and wherein each left and right rail contains a U-shaped channel (see FIG. 3) for receiving the rollers therein, and wherein there are a total of four rollers, wherein one roller is disposed on each of an upper and lower rear corner of the storage tray.

We claim:

1. A motorized storage system for mounting on a wall, (a) a framework having upper and lower horizontal frame members and a right vertical side frame member, said framework being attached to the wall;

(b) left and right rails each having upper and lower ends, wherein said upper ends of said left and right rails are attached to said upper horizontal frame member and said lower ends of said left and right rails are attached to said lower horizontal frame member;

(c) a storage tray for storing articles thereon, wherein said storage tray is movably disposed on said left and right rails;

(d) a plurality of rollers attached to said storage tray, wherein said plurality of rollers arc disposed in said left and right rails so that said storage tray rolls along said left and right rails to permit said storage tray to move upwardly and downwardly on the wall;

(e) a rotating rod disposed on said upper horizontal frame member, wherein said rotating rod is rotatably mounted on a plurality of support brackets, said support brackets being mounted on a front of said upper horizontal frame member;

(f) left and right sprockets and a take-up reel being disposed on said rotating rod;

(g) a winch containing a cable on a spool, wherein said winch is disposed on said framework, said cable having first and second ends wherein said first end of said cable is connected to said spool on said winch and said second end of said cable is connected to said take-up reel;

(h) left and right chains each having lower and upper ends, wherein said lower ends are connected to said storage tray and said upper ends are connected to a counterweight rod for tensioning said chains, wherein an intermediate portion of said left chain passes over said left sprocket and an intermediate portion of said right chain passes over said right sprocket; and (i) wherein when said winch turns in a first direction said storage tray is raised and when said winch turns in an opposite direction said storage tray is lowered.

2. The motorized storage system of claim 1, further comprising an electric motor disposed on said winch for turning said winch.

3. The motorized storage system of claim 2, further comprising a remote control for controlling the operation of said electric motor.

4. The motorized storage system of claim 3, wherein said remote control is connected by hardwire to said electric motor.

5. The motorized storage system of claim 1, further comprising a containment framework disposed around an outer peripheral edge of said storage tray for containing articles within said storage tray.

6. The motorized storage system of claim 1, further comprising a coupler for connecting each said roller to said storage tray.

7. The motorized storage system of claim 1, wherein each said left and right rail contains a U-shaped channel for receiving said rollers therein.

8. The motorized storage system of claim 7, wherein there are a total of four said rollers, wherein one said roller is disposed on each of an upper and lower rear corner of said storage tray.

9. A method for assembling a motorized storage system for mounting on a wall, comprising the steps of:

(a) providing a framework having upper and lower horizontal frame members and a right vertical side frame member, the framework being attached to the wall;

(b) providing left and right rails each having upper and lower ends, wherein the upper ends of the left and right rails are attached to the upper horizontal frame member and the lower ends of the left and right rails are attached to the lower horizontal frame member;

(c) providing a storage tray for storing articles thereon, wherein the storage tray is movably disposed on the left and right rails;

(d) providing a plurality of rollers attached to the storage tray, wherein the plurality of rollers are disposed in the left and right rails so that the storage tray rolls along the left and right rails to permit the storage tray to move upwardly and downwardly on the wall;

(e) providing a rotating rod on the upper horizontal frame member, wherein the rotating rod is rotatably mounted on a plurality of support brackets, the support brackets being mounted on a front of the upper horizontal frame member;

(f) providing left and right sprockets and a take-up reel being disposed on the rotating rod;

(g) providing a winch containing a cable on a spool, wherein the winch is disposed on the framework, the cable having first and second ends wherein the first end of the cable is connected to the spool on the winch and the second end of the cable is connected to the take-up reel;

(h) providing left and right chains each having lower and upper ends, wherein the lower ends are connected to the storage tray and the upper ends are connected to a counterweight rod for tensioning the chains, wherein an intermediate portion of the left chain passes over the left sprocket and an intermediate portion of the right chain passes over the right sprocket; and (i) turning the winch in a first direction to raise the storage tray; turning the winch in a second direction opposite the first direction to lower the storage tray.

10. The method of claim 9, further comprising the step of providing an electric motor disposed on the winch for turning the winch.

11. The method of claim 10, further comprising the step of providing a remote control for controlling the operation of the electric motor.

12. The method of claim 11, wherein the remote control is connected by hardwire to the electric motor.

13. The method of claim 9, further comprising the step of providing a containment framework disposed around an outer peripheral edge of the storage tray for containing articles within the storage tray.

14. The method of claim 9, further comprising the step of providing a coupler for connecting each roller to the storage tray.

15. The method of claim 9, wherein each left and right rail contains a U-shaped channel for receiving the rollers therein.

16. The method of claim 15, wherein there are a total of four rollers, wherein one roller is disposed on each of an upper and lower rear corner of the storage tray.

* * * * *